United States Patent [19]

Klein

[11] Patent Number: 4,658,577

[45] Date of Patent: Apr. 21, 1987

[54] SELF-SUPPORTING CABLE CARRIER

[75] Inventor: Ernst Klein, Dusseldorf, Fed. Rep. of Germany

[73] Assignee: A&A Manufacturing Co., Inc., New Berlin, Wis.

[21] Appl. No.: 796,276

[22] Filed: Nov. 8, 1985

Related U.S. Application Data

[63] Continuation of Ser. No. 651,994, Sep. 17, 1984, abandoned.

[30] Foreign Application Priority Data

Sep. 16, 1983 [DE] Fed. Rep. of Germany ....... 3333543

[51] Int. Cl.$^4$ ............................................. F16G 13/16
[52] U.S. Cl. ....................................... 59/78.1; 248/49
[58] Field of Search ................... 59/78.1, 900; 248/49, 248/51, 52, 78

[56] References Cited

U.S. PATENT DOCUMENTS

| | | | |
|---|---|---|---|
| 3,664,619 | 5/1972 | Heidrich et al. | 59/78.1 |
| 3,779,003 | 12/1973 | Boissevain et al. | 59/78.1 |
| 4,392,344 | 7/1983 | Gordon et al. | 59/78.1 |
| 4,570,437 | 2/1986 | Moritz | 59/78.1 |

Primary Examiner—Lowell A. Larson
Assistant Examiner—David B. Jones
Attorney, Agent, or Firm—Quarles & Brady

[57] ABSTRACT

A self supporting cable carrier in the form of a flexible tube for fully enclosing the cable to protect it from damage as well as to support it. The flexible tube comprises a plurality of segments or links coupled to each other successively and pivotable relative to each other a limited amount. The segments are constructed so that they can etend in a straight line and can pivot from this straight line in one direction but not in the other direction. As a result the carrier can carry the cable along a curve in one direction but a span of tubing extending across a space cannot collapse since the segments cannot pivot in that direction. This arrangement makes the carrier self supporting along such span. The segments are formed of molded plastic with each segment having a pair of bosses extending inwardly from its trailing portion and a pair of complementary openings in its forward portion for receiving the bosses from the adjoining segment to couple the two segments together. The bosses are dimensioned so that they are pivotable a limited amount within their cooperating openings to render the entire segment pivotable such limited amount relative to its adjacent segment. Moreover, the bosses and their cooperating openings are completely covered when the segments are assembled to eliminate pinch points and fully protect the coupling.

6 Claims, 7 Drawing Figures

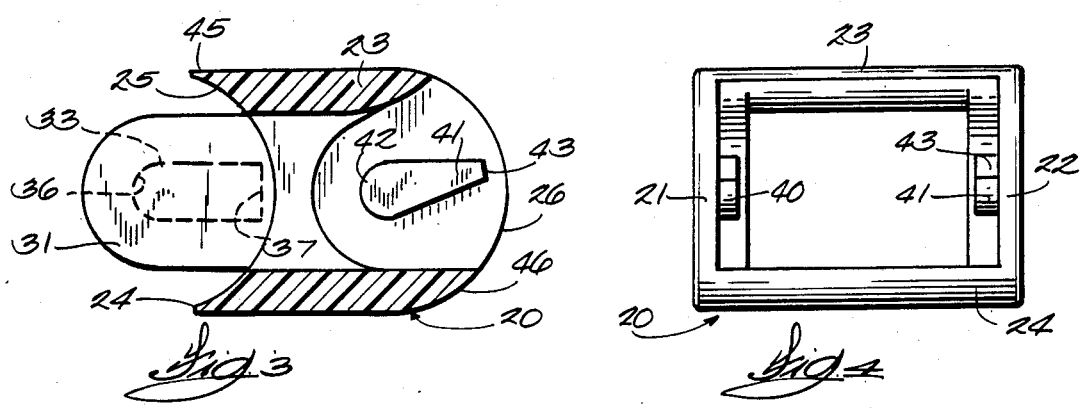
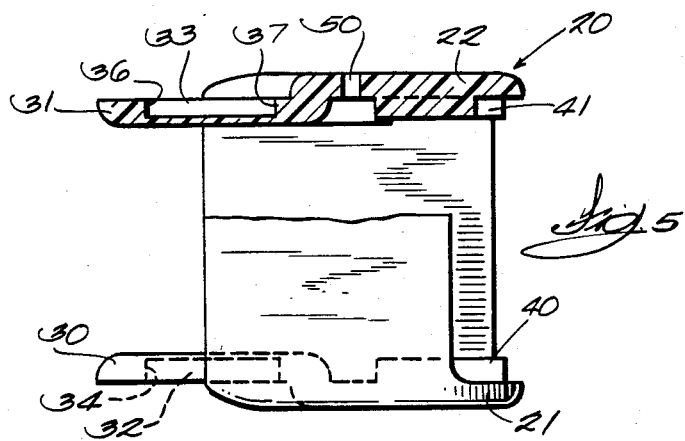
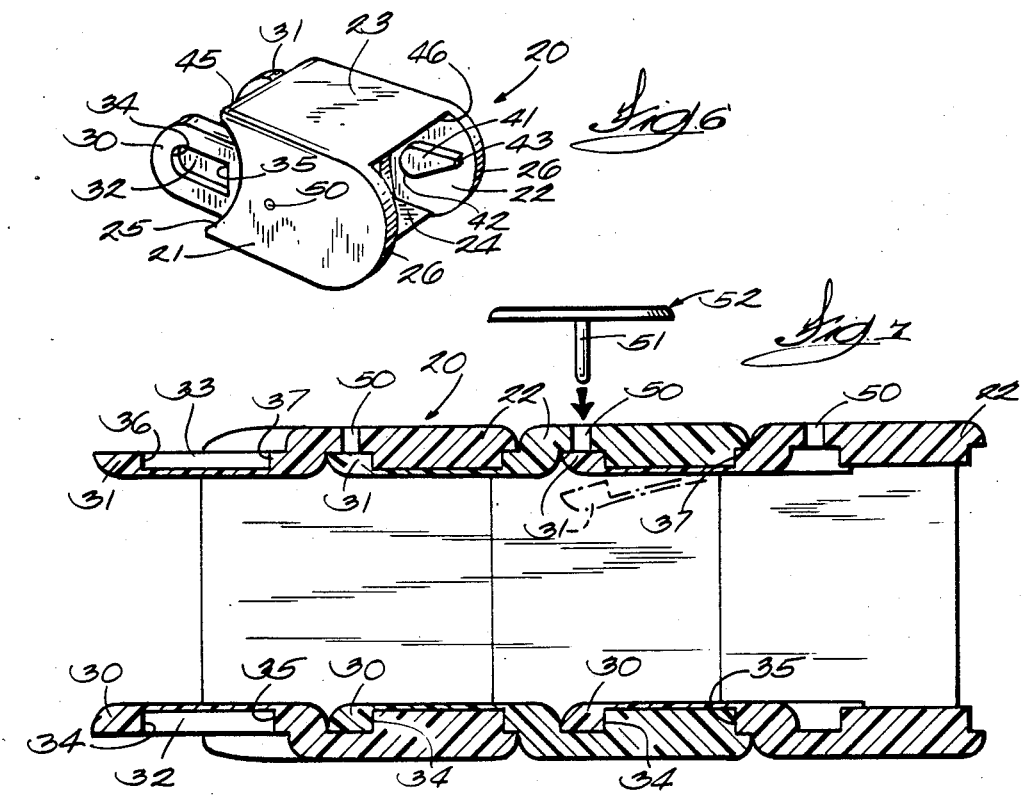

SELF-SUPPORTING CABLE CARRIER

This is a continuation of my copending patent application Ser. No. 651,994 filed Sept. 17, 1984, now abandoned.

BACKGROUND OF THE INVENTION

The present invention pertains to cable carriers and more particularly to carriers for protecting and supporting electrical cable or hydraulic conduit and the like that is connected at one end to a stationary member and at its opposite end to a movable member for conducting energy to the movable member.

A variety of cable carriers are available for supporting electrical cable or fluid conduits between a stationary point and a movable member. Such cables are frequently employed in large machine tools where energy must be transmitted to a movable element of the machine tool. One characteristic that is usually desirable in this structure is that the carrier be bendable in one direction only. With this arrangement the cable carrier is capable of following a curve in one direction but the span of the carrier that extends through space from the top of the curve to the cable coupling is self supporting. Accordingly, such straight span of the carrier will not collapse to the support beneath it because it is unable to bend in this direction. Such characteristic makes the cable carrier self supporting along the straight span that extends through space. The span of the cable carrier extending from the other end of the curved position is supported by a flat surface such as the base of the machine or the floor on which the machine is resting.

One of the cable carriers having such characteristic is disclosed in U.S. Pat. No. 3,590,854 issued to Gordon H. Cork on July 6, 1971. The patent discloses a link chain type of cable carrier in which two link chains are connected to each other in parallel spaced relationship by bridges used the cables are carried on the bridges between the two link chains and remains exposed. This type of cable carrier is employed in the more demanding applications for carrying relatively heavy cables.

Another type of cable carrier possessing the above mentioned characteristics is described in U.S. Pat. No. 3,957,084 issued May 18, 1976 to Jung. The cable carrier disclosed in this patent is formed of a profiled strip of steel wound along a spiral path to form a flexible tube for fully enclosing the cable that is being supported to thereby fully protect it from damage. U.S. Pat. No. 4,392,344 also discloses a cable carrier that incorporates the desired characteristics and fully encloses the cable. Moreover, this cable carrier is formed of molded links or segments coupled together to form a flexible tube.

The present invention also operates to fully enclose the cable, and it is formed of a plurality of molded plastic segments that are coupled to each other successively to form the elongated flexible tube for receiving the cable within it.

SUMMARY OF THE INVENTION

According to this invention the improved self supporting cable carrier comprises a plurality of segments or links formed of molded plastic that are connected to each other successively to form the flexible tube for receiving the cable to be supported and protected. Each segment is pivotable relative to the two adjacent segments a limited amount. Normally the assembled segments can be pivoted into alignment with each other so that they form a straight tube and then can be pivoted in one direction only from this aligned position.

Thus, the cable carrier will usually extend from a fixed connection on a stationary member to a connection with a movable member of the machine in which the coupling to the movable member is at a different level. The cable carrier may extend from the stationary member at a lower level and then pass upwardly through an arc of 180° to extend through an upper span back to the movable member for connection thereto. The span from the upper end of the curve to the movable member will be self supporting because the segments in this span are pivotable downwardly relative to each other but cannot pivot upwardly relative to each other. As a result, the straight span of tubing from the curve to the movable member cannot collapse because it is self supporting from the straight line orientation.

The limited pivotal movement of the segments relative to each other is achieved in the present invention by providing a pair of bosses at the trailing end of each segment for engagement with a pair of complementary openings in the forward end of each segment. The openings are dimensioned so that the bosses can pivot within them a limited amount to limit the pivotal movement of the entire segment relative to an adjoining segment by the same amount.

Accordingly, it is a general object of the present invention to provide an improved flexible tube cable carrier of sturdy but inexpensive construction that is efficient in operation.

A further object is to provide a flexible tube cable carrier formed of a plurality of molded plastic segments or links that are coupled to each other successively to form an elongated fully enclosed tube for receiving the cable.

Another object is to provide an improved flexible tube cable carrier foormed of a plurality of segments assembled to each other successively in which the coupling elements for coupling the segments to each other are formed integrally into each segment so that the segments are coupled to each other without the use of any extraneous parts and the coupling is fully enclosed for protection from dirt and debris and to eliminate pinch points in the assembly.

The foregoing and other objects of this invention, which will become more fully apparent from the following detailed description, may be achieved by means of the exemplifying apparatus depicted in and set forth in this specification in connection with the accompanying drawings.

BRIEF DESCRIPTION OF THE DRAWING

FIG. 3 is a view in vertical section through one of the segments forming the self supporting cable carrier shown in FIG. 2;

FIG. 4 is a right end view of the cable carrier segment depicted in FIG. 3;

FIG. 5 is a top view of the cable carrier segment illustrated in FIG. 3;

FIG. 6 is a perspective view of the cable carrier segment shown in FIG. 3; and

FIG. 7 is a view in horizontal section of a portion of the cable carrier illustrated in FIG. 2 showing the application of a tool for disconnecting the individual segments of the cable carrier from an adjacent segment.

DETAILED DESCRIPTION OF THE PREFERRED EMBODIMENT

Figure 1:
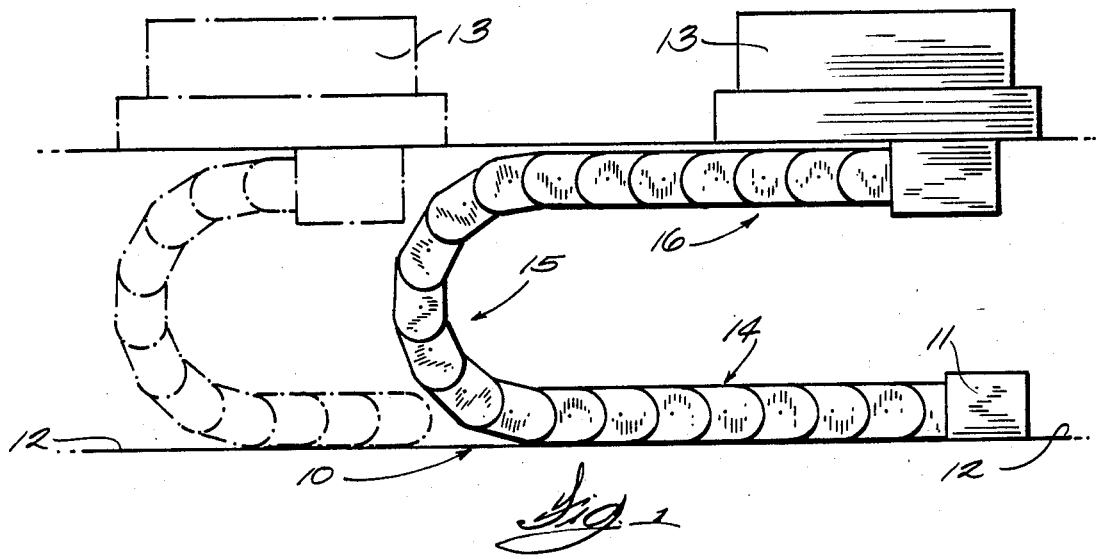
FIG. 1 is a schematic illustration of an apparatus employing the self supporting cable carrier of the present invention with the cable carrier being shown in a second position by broken lines.

Reference is now made more particularly to the drawings and specifically to FIG. 1 thereof which illustrates a self supporting cable carrier according to the present invention applied to carry cables between two members of a machine, the latter being illustrated schematically. As there shown, the cable carrier is generally identified by the reference numeral 10 and has its lower end coupled to a machine member 11 that is fixedly mounted on the base 12. The upper end of the cable carrier 10 is coupled to a movable member 13 that moves in a horizontal path of travel. The cable carrier 10 carries one or more cables or conductors (not shown) which are provided to transmit energy from the fixed member 11 to the movable member 13.

As the movable member 13 moves in its path of travel, the cable carrier 10 guides the conductors to move with it. Thus, in FIG. 1, the movable member 13 is shown in solid lines in a first position and in broken lines in a second position with the cable carrier 10 moving with it while retaining the conductors within it in proper position. A straight portion of the cable carrier 10 generally identified by the reference numeral 14 extends from the fixed member 11 and is supported by the surface of the base 12. The cable carrier then curves upwardly about a curved portion generally identified by the reference numeral 15 to another straight portion generally identified by the reference numeral 16 and which extends from the top of the curved portion 15 to the movable member 13. The cable carrier 10 is so constructed that it can bend only in the direction of the curve 15 and not in the opposite direction. This construction renders the straight section 16 self supporting because if the cable carrier 10 cannot bend in a direction opposite to the curve 15, the straight portion 16 cannot collapse but will be retained in a straight line extending across space by reason of its built-in characteristics. These characteristics render the cable carrier 10 flexible in one direction but rigid in the other.

The cable carrier 10 is formed of a plurality of segments or links each of which is generally identified by the reference numeral 20. Each of the sections 20 is of rectangular cross-section with a hollow interior as shown in FIGS. 4 and 6. The sections are linked to each other successively and are pivotable relative to each other a limited amount to form a flexbile tube and the cable or conductors (not shown) are contained within the tube. Thus, the cable or conductors are fully enclosed while being supported by the flexible tube for movement with the movable member of the machine.

The segments 20 are identical in construction and are preferably molded in one piece from a suitable plastic material. Each segment 20 comprises a pair of side walls 21 and 22 connected together by a top wall 23 and a bottom wall 24 to form a rectangular enclosure presenting an axial opening for admitting the passage of cable through it. For the purpose of this description, the left side of the segment 20 as viewed in FIGS. 3, 5 and 6 will be referred to as the forward or leading end of the segment while the right end as viewed in FIGS. 3, 5 and 6 will be referred to as the rear or trailing end.

The side walls 21 and 22 of each of the segments 20 is provided with an arcuate recess 25 at its forward end and an outwardly rounded edge 26 at its trailing end. The arcuate ends 25 and 26 complement each other so that when the segments 20 are linked together to form the complete flexible tube, arcuate end 26 of one segment fits into the arcuate recess 25 of the adjacent segment with the arcuate ends permitting the segments to pivot relative to each other.

Extending forwardly from the arcuate recess 25 of the side wall 21 is a coupling member 30 with an identical coupling member 31 extending forwardly from the arcuate recess 25 of the side wall 22. The outer surface of the coupling member 30 is provided with an elongated recess 32 and an identical recess 33 is formed in the outer surface of the coupling member 31. The recess 32 includes a rounded forward end 34 and a straight rear end 35. In like manner, the recess 33 on the coupling member 31 includes an identical rounded forward end 36 and a straight rear end 37.

The recesses 32 and 33 are configured to receive complementary bosses 40 and 42 respectively of the adjacent segment 20 for securing the two segments together while permitting them to pivot relative to each other. The bosses 40 and 41 are formed on the inner surfaces of the side walls 21 and 22 respectively at their trailing end. The bosses 40 and 41 are identical in configuration and as clearly shown in FIG. 3, they include a large rounded forward end 42 that tapers down to a narrow straight end 43. The rounded forward end 42 of the bosses 40 and 41 is adapted to fit into the rounded forward ends 34 and 36 of the recesses 32 and 33 respectively. With this arrangement, the bosses 40 and 41 are free to pivot within the recesses 32 and 33 respectively of the adjacent segment 20.

In order to permit such pivotal movement of the bosses 40 and 41 within the recesses 32 and 33 respectively, the rear ends 43 of the bosses 40 and 41 are much narrower than the straight rear ends 35 and 37 of the recesses 32 and 33 respectively. Therefore, the rounded forward ends 42 of the bosses 40 and 41 are free to pivot within the rounded forward ends 34 and 37 of the recesses 32 and 33 respectively and the narrowed rear ends 43 of the bosses 40 and 41 permits a limited amount of such pivotal movement of the bosses 40 and 41 within the recesses.

The movement of the bosses 40 and 41 within the recesses 32 and 33 respectively for limiting the pivotal movement of the segments 20 relative to each other establishes the amount of curvature the cable carrier 10 can follow. The operation of the bosses 40 and 41 in the recesses 32 and 33 to perform this function will be described in connection with the illustration in FIG. 2. In this view the reference numerals are provided with letter suffixes to identify each of the bosses 40 and recesses 32 as well as the segments 20 in their different positions along the assembly. It is to be understood that the bosses 41 will be in the same positions in their associated recesses 33.

Figure 2:
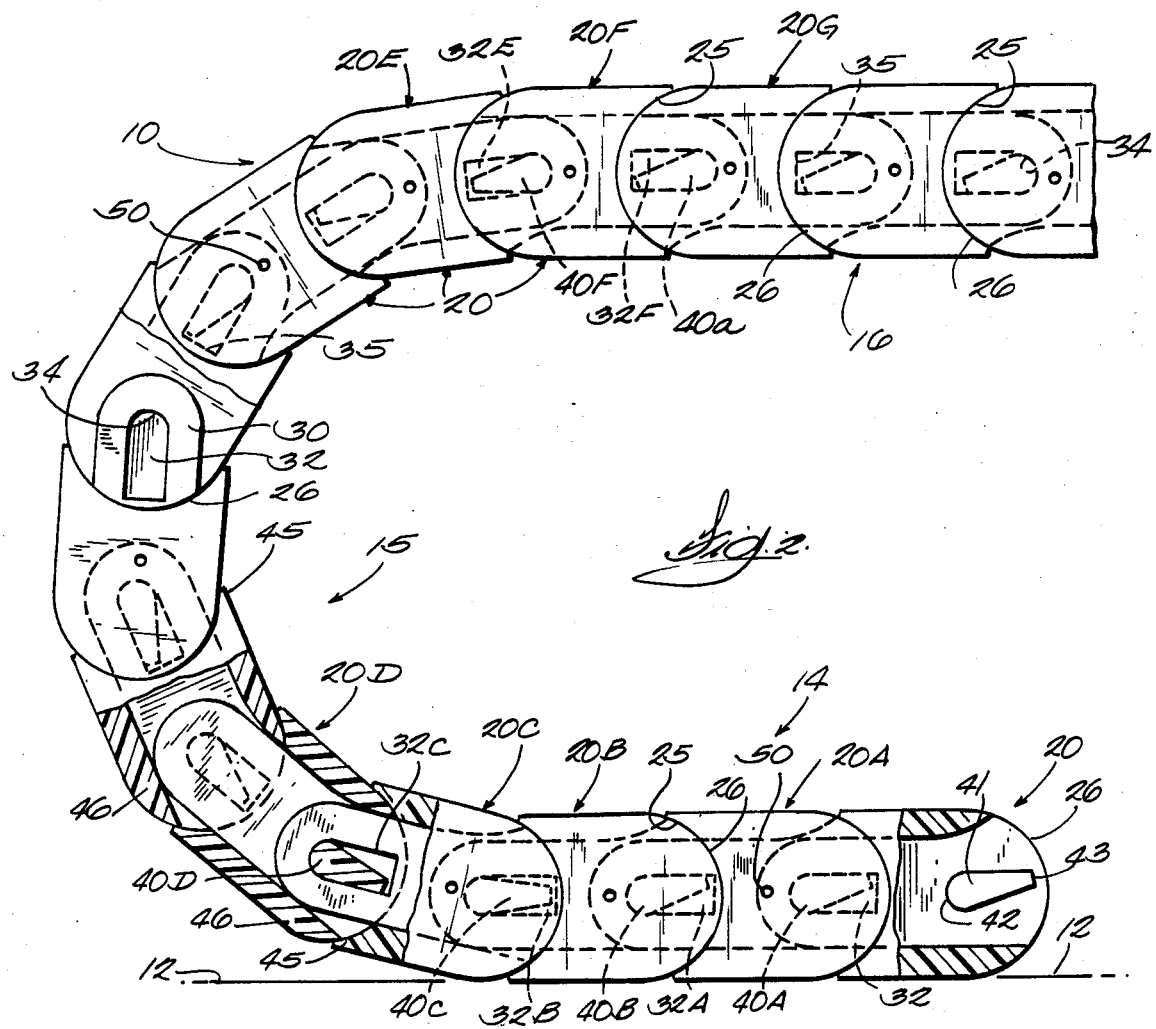
FIG. 2 is a side elevational view of a self supporting cable carrier incorporating the features of the present invention with portions broken away to show the interior construction.

The first segment at the bottom of the view in FIG. 2 is identified by the reference numeral 20 and is shown resting on the base 12. Its recess 32 is in engagement with the boss 40A of the segment 20A. The top edge of the boss 40A is in engagement with the top side of the recess 32 and therefore such positioning of the boss 40A in the recess 32 would prevent the segments 20 and 20A from pivoting downwardly relative to each other but either one of these segments could move in an upwardly direction relative to each other. However, since these two segments plus the segment 20B are resting in a straight line upon the base 12 no pivoting movement occurs.

Segment 20C initiates the curved section 15 of the cable carrier 10. Accordingly, the segment 20C is pivoted upwardly relative to its adjacent segment 20B and the boss 40C of the segment 20C moves in a clockwise direction within the recess 32B so that its upper edge no longer engages the top side of the recess 32B. Instead, the boss 40C has pivoted to a somewhat central location within the recess 32B.

The segment 20D pivots slightly further with respect to its adjacent segment 20C so that the lower edge of its boss 40D engages the lower side of the recess 32C of the adjacent segment 20C. This is the limit of pivotal movement of the segment 20D and it limits the radius of the curve in the section 15 because no further pivotal movement of the segment 20D can take place with respect to the adjacent segment 20C. This also holds true for the rest of the segments 20 in the curved section 15 so that the radius of the curve is established by the amount of pivotal movement of the bosses 40 in their associated recesses 32.

However, at the top of the curve in the curved section 15, the cable carrier begins to straighten and the segments 20 move back into alignment with each other. Thus, segment 20E is the last segment along the curved section 15 and the succeeding segment 20F takes a substantially horizontal position. Since the angle between the segment 20F and its preceding segment 20E is reduced, the boss 40F no longer has its side abutting the side of the recess 32E but has moved away from the side so that it is somewhat centrally disposed in the recess 32E.

However, the segment 20F and the succeeding segments are in the horizontal straight span 16 so that the segment 20F is in alignment with the segment 20G. Therefore, the boss 40G has its lower side abutting the lower side of the recess 32F. The bosses 40 of all of the segments in the horizontal straight span 16 are in this position. Accordingly, the segment 20F cannot pivot upwardly or counterclockwise with respect to the segment 20F. This is true because the lower side of the boss 40G is in abuttment with the lower side of the recess 32F so that the only direction that the segment 20G can pivot is in a downward or clockwise direction. This characteristic of the segments renders the horizontal span 16 of the cable carrier 10 self-supporting because this portion of the cable carrier cannot collapse toward the floor and the successive segments remain in a substantially straight line.

As previously mentioned, the convex arcuate ends of the sides 21 and 22 fit into the concave arcuate ends of the succeeding segment so that the segments are free to pivot relative to each other and when the segments are assembled, the only thing apparent from the exterior of the assembly is the arcuate seam between the two segments. Moreover, the coupling member 30 fits into the interior of the succeeding segments 20 with its recesses 32 in engagement with the bosses 40 so that the coupling structure is completely enclosed within the interior of the flexible tube forming the cable carrier. Accordingly, even though parts of the segments 20 are pivoting relative to each other, there is no pinch point whatsoever on the exterior of the assembly which might cause injury to personnel and the moving parts are protected from dirt and debris so that the assembly will not be damaged even though it may be operating in a dirty environment.

Moreover the forward ends 45 of the segments 20 between the concave arcuate ends 25 are designed to overlap the preceding segment 20 at the end 46 between the convex ends 26. This is apparent in the assembly shown in FIG. 2 where the forward end 45 of the segment 20D is shown overlapping the rear end 46 of the next segment 20 in the assembly. As a result, no opening exists between segments even when the segments are in a curve so that the interior of the cable carrier is always protected from dirt and debris and no pinch points appear on the exterior of the unit that could injure personnel.

As clearly shown in FIG. 7, each of the segments is provided with a hole 50 in one of its sides for admitting a pin 51 extending from a tool generally identified by the reference numeral 52. The tool 52 is used for uncoupling the segments from each other. To this end the pin is inserted into the hole 50 so that its end engaged the coupling member 30 in the interior of the segment. Sufficient pressure is then applied to bend the coupling member 30 out of its normal position until its associated recess 32 curves out of engagement with its connecting boss 40 so that the two segments can be separated.

From the foregoing detailed description of the illustrative embodiment set forth herein to exemplify the present invention, it will be apparent that there has been provided an improved cable carrier formed of a plurality of molded segments or links that are linked together successively to form a flexible tube for supporting the conductors to a moveable member. The coupling elements of the segments are completely enclosed for their own protection as well as to avoid pinch points and the exterior of the flexible tube presents a smooth uninterrupted surface except for the arcuate seams between segments.

Although the illustrative embodiment of the invention has been described in considerable detail for the purpose of disclosing a practical operative structure whereby the invention may be practiced advantageously, it is to be understood that the apparatus described is intended to be illustrative only and that the novel characteristics of the invention may be incorporated in other structural forms without departing from the spirit and scope of the invention as defined in the subjoined claims.

The principles of this invention having now been fully explained in connection with the foregoing description, I hereby claim as my invention:

1. A cable carrier for supporing conductors between a fixed member and a movable member of a machine comprising; a plurality of segments, each of said segments having two sides connected together by a top and a bottom to form a central passage; a coupling member extending from each side of said segment in parallel relationship and adapted to extend into the central passage of the adjacent segment of the cable carrier; a boss formed on the interior of each side of said segments to extend therefrom into the passage of each segment; said coupling members having an opening in position to receive said bosses when the coupling members are inserted into the passage of the adjacent segment to couple the two segments together said openings permitting limited pivotal movement of said bosses within the openings for corresponding limited pivotal movement of said segments relative to each other so that the plurality of segments coupled to each other successively form a flexible tube for supporting and enclosing the conductors, and the bosses and the coupling members are completely enclosed within the passage so that the flexible tube presents a smooth outer surface.

2. A cable carrier according to claim 1 wherein the sides of one end of said segment present a concave arcuate surface, and the opposite end of said sides present a convex arcuate surface complementary to said concave surfaces so that when the segments are coupled together said convex ends fit into said concave ends and the two segments are free to pivot relative to each other.

3. A cable carrier according to claim 1 wherein said recesses and said bosses are positioned relative to each other so that said segments will pivot in only one direction from a straight line to render a span of the cable carrier to be self-supporting between two points.

4. A cable carrier according to claim 3 wherein said recesses are formed in said coupling member to extend along the axis of the segment, and said bosses are positioned so that their axes extend at an angle to the axis of the segment for locating the arc of the pivotal movement of said segments relative to each other.

5. A cable carrier for supporting conductors between a fixed member and movable member of a machine comprising; a plurality of segments, each of said segments having two sides connected together by a top and a bottom to form a central passage; a coupling member extending from each side of said segment in parallel relationship and adapted to extend into the passage of the adjacent segment of the cable carrier, said coupling member presenting an elongated opening having a semicircular end; an elongated boss formed on the interior of each side of said segments in position to be received within the elongated opening of the coupling members of the adjacent segment to couple the two segments together, said bosses having a semicircular end for engagement with the semicircular end of the opening in the coupling members so that the bosses can pivot within their cooperating openings to permit pivotal movement between adjacent segments, said bosses tapering inwardly from said circular end to enable limited pivotal movement of said bosses within their associated elongated openings to couple the two segments together for a corresponding limited pivotal movement relative to each other so that the plurality of segments coupled to each other successively form a flexible tube for supporting the conductors and the bosses and the coupling members are completely enclosed within the passage.

6. A cable carrier according to claim 5 wherein said recesses and said bosses are positioned relative to each other so that said segments will pivot in only one direction from a straight line to render a span of the cable carrier to be self-supporting between two points.

* * * * *